United States Patent
Bikumala et al.

(10) Patent No.: US 11,797,939 B2
(45) Date of Patent: Oct. 24, 2023

(54) ARTIFICIAL INTELLIGENCE-BASED RESOURCE SELECTION

(71) Applicant: Dell Products L.P., Round Rock, TX (US)

(72) Inventors: Sathish Kumar Bikumala, Round Rock, TX (US); Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 631 days.

(21) Appl. No.: 16/716,700

(22) Filed: Dec. 17, 2019

(65) Prior Publication Data
US 2021/0182798 A1  Jun. 17, 2021

(51) Int. Cl.
| | | |
|---|---|---|
| G06Q 10/1053 | (2023.01) | |
| G06F 16/951 | (2019.01) | |
| G06N 5/02 | (2023.01) | |
| G06F 40/20 | (2020.01) | |
| G06N 20/00 | (2019.01) | |

(52) U.S. Cl.
CPC ....... *G06Q 10/1053* (2013.01); *G06F 16/951* (2019.01); *G06F 40/20* (2020.01); *G06N 5/02* (2013.01); *G06N 20/00* (2019.01)

(58) Field of Classification Search
CPC ... G06Q 10/1053; G06F 16/951; G06F 40/20; G06N 5/02; G06N 20/00
See application file for complete search history.

(56) References Cited

U.S. PATENT DOCUMENTS

| | | | |
|---|---|---|---|
| 10,437,660 B2 | 10/2019 | Bikumala et al. | |
| 2011/0208665 A1* | 8/2011 | Hirsch | G06Q 10/1053 705/321 |
| 2016/0118050 A1* | 4/2016 | Arslan | G10L 17/26 704/235 |
| 2018/0089627 A1* | 3/2018 | Liss | G06F 16/951 |
| 2018/0150739 A1* | 5/2018 | Wu | G06N 20/10 |
| 2018/0336528 A1* | 11/2018 | Carpenter | G06F 16/3334 |
| 2019/0188645 A1* | 6/2019 | Monasor | G06F 16/00 |

(Continued)

OTHER PUBLICATIONS

Shen, Ying, et al. "Knowledge-aware attentive neural network for ranking question answer pairs." The 41st International ACM SIGIR Conference on Research & Development in Information Retrieval. 2018 (Year: 2018).*

(Continued)

*Primary Examiner* — Brendan S O'Shea
(74) *Attorney, Agent, or Firm* — Ryan, Mason & Lewis, LLP

(57) ABSTRACT

A method includes retrieving information regarding a candidate from a plurality of sources, and analyzing the information regarding the candidate using one or more machine learning techniques. A plurality of questions for the candidate are generated based on the analysis. The method further includes receiving and analyzing a plurality of natural language responses to the plurality of questions from the candidate, and computing a plurality of confidence scores for the plurality of natural language responses using the one or more machine learning techniques. The plurality of questions and the plurality of confidence scores are provided to a user via a user interface.

20 Claims, 6 Drawing Sheets

(56) References Cited

U.S. PATENT DOCUMENTS

2020/0134568 A1* 4/2020 Karri ................. G06Q 10/1053

OTHER PUBLICATIONS

Qin, Chuan, et al. "Duerquiz: a personalized question recommender system for intelligent job interview." Proceedings of the 25th ACM SIGKDD International Conference on Knowledge Discovery & Data Mining. 2019. (Year: 2019).*
Purohit, Jitendra, et al. "Natural language processing based jaro—the interviewing chatbot." 2019 3rd International Conference on Computing Methodologies and Communication (ICCMC). IEEE, 2019. (Year: 2019).*
Yu Chen et al., "Bidirectional Attentive Memory Networks for Question Answering over Knowledge Bases," arXiv:1903.02188v3, May 28, 2019, 11 pages.
Wikipedia, "Bidirectional Recurrent Neural Networks," Oct. 15, 2019, 3 pages.
Wikipedia, "Long Short-term Memory," Nov. 20, 2019, 11 pages.
Jason Brownlee, "What are Word Embeddings for Text?" Deep Learning for Natural Language Processing, https://machinelearningmastery.com/what-are-word-embeddings/, Aug. 7, 2019, 20 pages.

* cited by examiner

```
28    queries, raw_queries, query_mentions, memories, cand_labels, _, gold_ans_labels = data_vec
29    queries, query_words, query_lengths, memories_vec = vectorize_data(queries, query_mentions, memories, \
30                                 max_query_size=opt['query_size'], \
31                                 max_query_markup_size=opt['query_markup_size'], \
32                                 max_ans_bow_size=opt['ans_bow_size'], \
33                                 vocab2id=vocab2id)
34
35    start = timeit.default_timer()
36
37    model = CustomGoalAgent(opt, ctx_stopwords, vocab2id)
38    pred = model.predict(memories_vec, queries, query_words, raw_queries, query_mentions, query_lengths, cand_labels, batch_size=opt['test_batch_size'], margin=2)
39
40    print('\nPredictions')
41    for margin in opt['test_margin']:
42        print('\nMargin: {}'.format(margin))
43        predictions = dynamic_pred(pred, margin)
44        calc_avg_f1(gold_ans_labels, predictions)
45
46    print('Runtime: %ss' % (timeit.default_timer() - start))
47    import pdb;pdb.set_trace()
```

FIG. 3

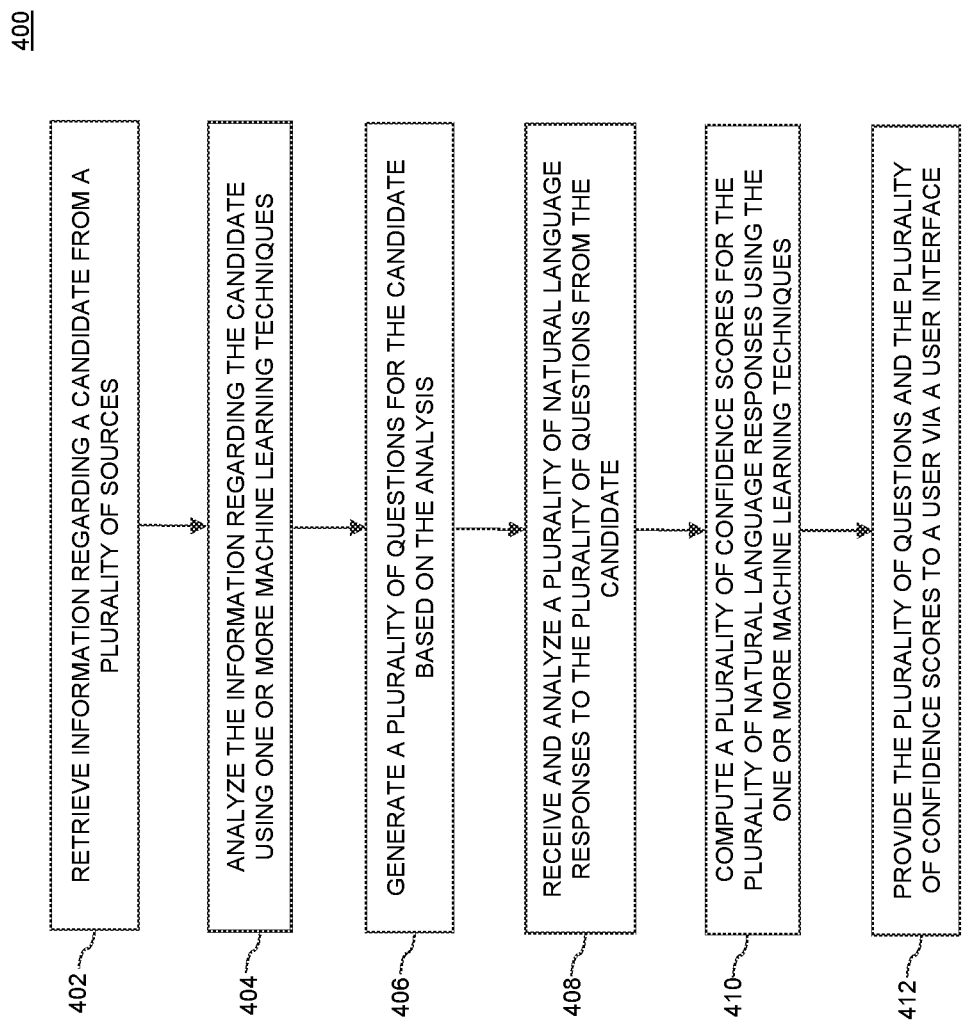

ARTIFICIAL INTELLIGENCE-BASED RESOURCE SELECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for artificial intelligence (AI) based resource selection.

BACKGROUND

Current techniques for gathering information about prospective resources such as, for example, potential employees, contractors and/or service providers, do not consistently yield accurate information about the resources, and often do not result in selection of the best candidate for the job(s) or task(s). For example, the selection and/or development of questions to present to a prospective resource during the application process may not provide the hiring entity with a complete and accurate picture of the candidate. The questions may not yield answers that give a hiring entity the desired level of confidence that the prospective resource has the necessary skills and/or traits to be a good fit for the entity and the required tasks. The questions also should be culturally sensitive, while eliciting desired information from a potential resource.

Additionally, a hiring entity can benefit from assistance with navigating through the many available data sources such as, for example, social media, news articles, periodical publications, databases, etc., to quickly and efficiently extract information about an applicant.

Current information gathering approaches lack the efficiency and the capability to process information from a variety of sources to yield useful information for a hiring entity, and lack the ability to verify the veracity of a candidate's answers or provided information from a resume. In addition, there are no techniques in place to quantify the quality of answers or the relevance of advertised skills to a position which needs to be filled. Further, conventional methods do not provide time-sensitive analysis of differences or similarities between an interviewer and a prospective resource to provide results that can be used when conducting a candidate interview.

SUMMARY

In one embodiment, a method includes retrieving information regarding a candidate from a plurality of sources, and analyzing the information regarding the candidate using one or more machine learning techniques. A plurality of questions for the candidate are generated based on the analysis. The method further includes receiving and analyzing a plurality of natural language responses to the plurality of questions from the candidate, and computing a plurality of confidence scores for the plurality of natural language responses using the one or more machine learning techniques. The plurality of questions and the plurality of confidence scores are provided to a user via a user interface.

These and other illustrative embodiments include, without limitation, methods, apparatus, networks, systems and processor-readable storage media.

BRIEF DESCRIPTION OF THE DRAWINGS

FIG. 2 depicts example pseudocode for training an AI/ML model in an illustrative embodiment.

FIG. 3 depicts example pseudocode for testing an AI/ML model in an illustrative embodiment in an illustrative embodiment.

FIG. 4 is a flow diagram of a method for using AI/ML to evaluate candidate data and responses during a selection process in an illustrative embodiment.

DETAILED DESCRIPTION

Figure 1:
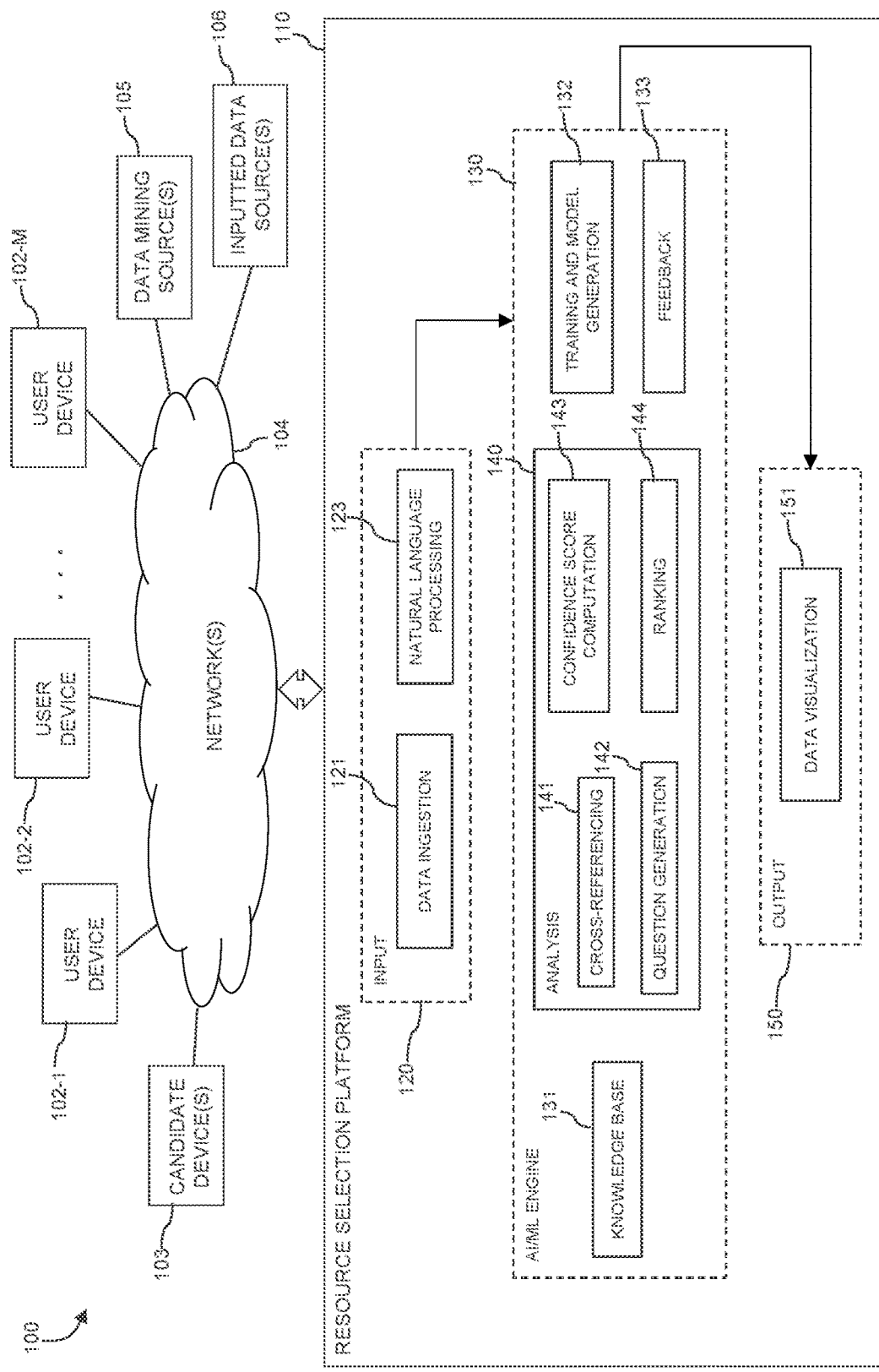
FIG. 1 is a block diagram of an information processing system comprising a resource selection platform configured for using artificial intelligence/machine learning (AI/ML) to evaluate candidate data and responses during a selection process in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "natural language processing (NLP)" can refer to interactions between computers and human (natural)

languages, where computers are able to derive meaning from human or natural language input, and respond to requests and/or commands provided by a human using natural language.

As used herein, "natural language understanding (NLU)" can refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Illustrative embodiments provide techniques for building an applicant's profile by crawling multiple web sources, providing questions to ask during an interview process and providing feedback in real-time based on a candidate's responses. Embodiments advantageously provide an AI tool that analyzes data from multiple sources (i) to identify areas of expertise of an interviewer and of a prospective resource; (ii) to identify cultural and/or sensitive areas of concern for a potential resource; (iii) to generate questions for a candidate based on the analysis; and (iv) to evaluate, in real-time, responses given by a candidate to questions posed during an interview.

FIG. 1 shows an information processing system 100 configured in accordance with an illustrative embodiment. The information processing system 100 comprises user devices 102-1, 102-2, . . . 102-M (collectively "user devices 102"). The information processing system 100 further comprises one or more candidate devices 103. The user devices 102 and the candidate devices 103 communicate over a network 104 with a resource selection platform 110.

The user devices 102 and the candidate devices 103 can comprise, for example, desktop, laptop or tablet computers, mobile telephones, landline telephones or other types of processing devices capable of communicating with the resource selection platform 110 over the network 104. Such devices are examples of what are more generally referred to herein as "processing devices." Some of these processing devices are also generally referred to herein as "computers." A landline or mobile telephone, or other processing device may, in combination with a computer, transmit natural language voice input to the resource selection platform 110.

The user devices 102 and the candidate devices 103 may also or alternately comprise virtualized computing resources, such as virtual machines (VMs), containers, etc. The user devices 102 and the candidate devices 103 in some embodiments comprise respective computers associated with a particular company, organization or other enterprise. The variable M and other similar index variables herein such as K and L are assumed to be arbitrary positive integers greater than or equal to two.

The term "client", "user" or "candidate" herein is intended to be broadly construed so as to encompass numerous arrangements of human, hardware, software or firmware entities, as well as combinations of such entities. Resource selection services may be provided for users utilizing one or more machine learning models, although it is to be appreciated that other types of infrastructure arrangements could be used. At least a portion of the available services and functionalities provided by the resource selection platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the resource selection platform 110, as well as to support communication between the resource selection platform 110 and connected devices (e.g., user and candidate devices 102 and 103) and/or other related systems and devices not explicitly shown.

In some embodiments, the user devices 102 are assumed to be associated with individuals seeking resources on behalf an enterprise. Such individuals can include, but are not necessarily limited to, human resources personnel, managers, interviewers, recruiters, contract administrators, etc. seeking resources such as, but not necessarily limited to, potential employees, contractors and/or service providers for the enterprise. In some embodiments, the candidate devices 103 are assumed to be associated with individuals being considered as or representing potential resources (e.g., employees, contractors and/or service providers) to provide services to the enterprise.

The resource selection platform 110 in the present embodiment is assumed to be accessible to the user devices 102 and the candidate devices 103 over the network 104. In addition, as explained further herein, the resource selection platform 110 can access one or more data mining sources 105 and one or more inputted data sources 106 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The resource selection platform 110, on behalf of respective infrastructure tenants each corresponding to one or more users associated with respective ones of the user devices 102, provides for resource selection by using AI/ML techniques to evaluate candidate data and responses during a selection process. According to embodiments, the resource selection platform 110 uses novel AI/ML methods based upon neural networks to amalgamate information from multiple sources to understand contextual information about those individuals seeking resources on behalf of an enterprise and resource candidates to suggest a set of questions which can be asked to access relevant information for candidate (e.g., a candidate's technical expertise). The processes for suggesting the questions account for backgrounds of the individuals seeking the resources on behalf the enterprise, and can suggest questions to ascertain the relevant information from a candidate even when the resource seeking individuals lack an understanding of the relevant information. The resource selection platform 110 also uses novel AI/ML methods to suggest some topics or lines of inquiry which should be avoided based upon social history of candidate or enterprise ascertained from one or more data mining sources 105, such as social media platforms, like LinkedIn®. The resource selection platform 110 also uses novel AI/ML methods to evaluate a candidate's responses to questions in real-time during an interview to determine whether a candidate is being truthful about their skills and/or whether the potential resource is suitable for an advertised position of an enterprise or for providing the requested services to the enterprise.

Referring to FIG. 1, the resource selection platform 110 includes an input component 120, an AWL engine 130, and an output component 150. The AWL engine 130 includes a knowledge base 131, a training and model generation component 132, feedback component 133 and an analysis component 140. The analysis component 140 comprises a cross-referencing component 141, a question generation component 142, a confidence score computation component 143 and a ranking component 144.

The input component 120 comprises a data ingestion component 121 and a natural language processing (NLP) component 123. The data ingestion component 121 retrieves information regarding a candidate individual or enterprise from a plurality of sources, such as, for example data mining sources 105, from which information can be extracted using one or more network crawling techniques. The data mining sources 105 include, but are not necessarily limited to, social media platforms, such as LinkedIn® and Facebook®, commentary platforms such as the Better Business Bureau®, Yelp® and Reddit®, online publications, webpages and online databases. The data ingestion component uses network crawling techniques including, but not necessarily limited to, Internet bots, also referred to as spiders, that browse the World Wide Web, in order to extract information about a candidate based on, for example, a plurality of keywords identifying the candidate, the services at issue and associated skills of the candidate. The data ingestion component 121 also retrieves data from inputted data sources 106, such as, for example, resumes, curriculum vitaes, bids, profiles, etc., which may have been uploaded by candidates in advance of an interview.

The NLP component 123 use NLP techniques to analyze natural language (e.g., English, Spanish or other spoken language) responses provided by a candidate in response to questions posed to the candidate by a user. The NLP component 123 is also configured to analyze the posed questions to identify the questions and match each question with its corresponding response. The NLP component 123 processes verbal (e.g., spoken) and textual natural language inputs from a user and a candidate. The NLP component 123 uses NLP to determine a context of natural language input, which includes identifying topics, skills, education, background, experience related to the candidate and the services for which resources are being sought.

According to one or more embodiments, a word embedding layer is used to represent a natural language input as a sequence of embedded words. The word embedding layer includes, for example, keywords and/or key phrases relevant to different technical areas or enterprise divisions for which an enterprise may seek resources. The word embedding layer may be dynamically updated with new or modified keywords and key phrases. The updates may be performed by a user, or automatically using one or more machine learning techniques based on different inputs to the resource selection platform 110 from candidate responses and/or data sources 105 and 106. Artificial recurrent neural network (RNN) architecture, such as, for example, bidirectional long short-term memory (LSTM) can be used to encode natural language inputs.

Data from the input component 120 is provided to the AI/ML engine 130. According to one or more embodiments, the analysis component 140 of the AI/ML engine 130 uses one or more machine learning techniques, such as, for example, a neural network comprising a duo-directional attentive memory network, to analyze the data from the input component 120. For example, the analysis component 140 of the AI/ML engine 130 analyzes candidate information from the data sources 105 and 106. For example, the cross-referencing component 141 cross-references experience descriptions corresponding to different entities that may be found in an uploaded resume and/or uploaded curriculum vitae of a candidate to identify skills and/or areas of which the candidate may have knowledge. The embodiments are not necessarily limited to the duo-directional attentive memory network, and other machine learning techniques may be used.

The question generation component 142 generates a plurality of questions for the candidate based on the analysis, which are provided to a user via an interface on a user device 102. The question generation component 142 uses extracted information about a candidate's skill set gained from previous experiences, such as, for example, previous jobs, assignments, engagements, contracted tasks, etc. Based upon this context, the question generation component 142 generates a unique set of customized questions for a particular candidate. The plurality of questions for the candidate are also generated based on data from a knowledge base 131. For example, the knowledge base 131 comprises multiple reliable sources having data related to various technical areas or divisions of an enterprise for which resources may be sought. Such data is provided to the question generation component 142 and used to generate technically specific and accurate questions for a candidate.

The data from the knowledge base 131 also comprises data identifying one or more expertise areas of a user interviewing a candidate. According to one or more embodiments, the question generation component 142 can be configured to avoid questions corresponding to the expertise areas of the interviewer since the interviewer could develop such questions on their own. Instead, the question generation component 142 generates questions in areas with which the user interviewer may be unfamiliar and the interviewer would not normally ask so as to result in a more complete and well-rounded inquiry of a candidate.

The data from the knowledge base 131 also comprises a plurality of flags and/or rules regarding sensitive areas corresponding to a plurality of topics to avoid for the plurality of questions. For example, based on input from the knowledge base 131, the generated questions will avoid cultural or personal type inquiries of a candidate. In addition, the knowledge base 131 can include directives or rules from an enterprise seeking the resources regarding the enterprise's approach to interviewing candidates and the enterprise's format for the questions, and the types of questions that can be asked of a candidate.

The rules and/or directives in the knowledge base 131 can be generated based on analysis of data from the data sources 105 and/or 106, such as, for example, based on social histories of candidates from social media platforms. In addition, as described further herein, the knowledge base 131 is dynamically updated. For example, using the one or more machine learning techniques, the knowledge base identifies and generates new or modified rules based on a pool of questions being received and answers to the pool of questions being provided by multiple candidates in different interviews. In addition, the knowledge base 131 may periodically crawl predetermined online data sources to identify changes and/or updates to technical areas or divisions of an enterprise that may be identified or found in the online data sources.

As noted above, using NLP, the NLP component 123 analyzes a plurality of natural language responses given by a candidate to the plurality of questions. Based on data from the input component 120 concerning the plurality of natural language responses, the confidence score computation component 143 computes a plurality of confidence scores for the plurality of natural language responses using the one or more machine learning techniques. The confidence score computation component 143 includes a real-time transcript analyzer, which analyzes the responses of a candidate to posed questions in real-time and generates a confidence score for each response, which is provided to a user via an interface on a user device 102. According to one or more embodiments, the platform 110 is not recording or saving the responses of the candidate, and is only performing processing during the interview real-time. According to an embodiment, the real-time transcript analyzer includes a modified version of neural network, such as a duo-directional attentive memory network. However, as can be understood, the embodiments are not necessarily limited to the duo-directional attentive memory network, and other machine learning techniques may be used.

In real-time, the confidence score computation component 143 evaluates the responses given by a candidate to questions posed during an interview, and continuously provides the computed confidence scores to the user during an interview. For example, the confidence scores 143 provide the user with an evaluation of how well a candidate answers a question, and whether the information provided in response to a question is accurate. According to one or more embodiments, in determining how well a candidate answers a question, the confidence score computation component 143 accounts for and recognizes speech patterns in a candidate's response that may be outside of a baseline speech pattern for that candidate. For example, by identifying pauses and/or repetitive speech outside of the normal speech pattern for a candidate, the confidence score computation component 143 measures and quantifies a fluency or articulation of a response. In addition, based on knowledge of particular technical areas in the knowledge base 131, the confidence score computation component 143 determines whether candidate responses are technically correct, and match what has been determined to be a correct answer to the question. The confidence score computation component 143 also compares the question and the response to the question for similarities based on, for example, a similarity of terms used in the question and in the response, to determine whether the candidate provides a relevant answer to the question, or is not answering the posed question. The confidence score computation component 143 is further configured to compare answers to the same or similar questions given by other candidates from the knowledge base 131 and use confidence scores for those answers in the knowledge base 131 when determining the confidence scores for new responses. The knowledge base 131 is regularly updated with questions generated for multiple candidates and answers to the questions provided by the multiple candidates.

The confidence score computation component 143 also determines whether a candidate's responses are consistent with data about the candidate from the data sources 105 and 106. For example, the platform 110 may identify inconsistencies between a resume or social media profile and a candidate's answers, which can indicate that the candidate is not being truthful in their responses.

One or more of the above-referenced parameters for calculating the confidence score (e.g., speech pattern, technical accuracy/correctness, answer relevance, similarity to other candidate's responses and identified inconsistencies) may be used by confidence score computation component 143 and combined to calculate an overall confidence score. In some embodiments, the parameters may be weighted differently. In addition, the confidence score parameters discussed herein do not necessarily constitute an exhaustive listing of potential parameters, and other parameters may be used to compute confidence scores of responses. In addition to computing confidence scores based on the natural language responses, the responses may be used as a basis for generating additional questions for the candidate, or modifying generated questions.

A ranking component 144 is configured to rank the plurality of confidence scores for the plurality of natural language responses. For example, the confidence scores 144 may be ranked from highest to lowest for a user. The ranking component 144 is also configured to categorize the confidence scores 144 based on, for example, technical area, calculation parameter and/or candidate features such as, but not necessarily limited to, background and experience so as to give a user a quick snapshot of problematic or advantageous areas for a candidate.

According to an embodiment, previously generated questions and the corresponding candidate responses, and previously generated confidence scores, as well as user feedback from a feedback component 133 regarding generated questions, candidate responses and confidence scores are input to a database of historical data accessible by the training and model generation component 132. According to one or more embodiments, training datasets also comprise factual information about different technical areas or different divisions of an enterprise that may be relevant to hiring, engaging or enlisting resources. Training datasets comprising the historical data are used by the training and model generation component 132 to train the one or more machine learning models used in connection with generating new questions and computing new confidence scores. The training and model generation component 132 of the AI/ML engine 130 is trained based on historical data taken over various time periods, such as, but not necessarily limited to, one, two or six months, or one or two years. The historical data is continuously updated based on feedback from the feedback component 133.

Figure 2:
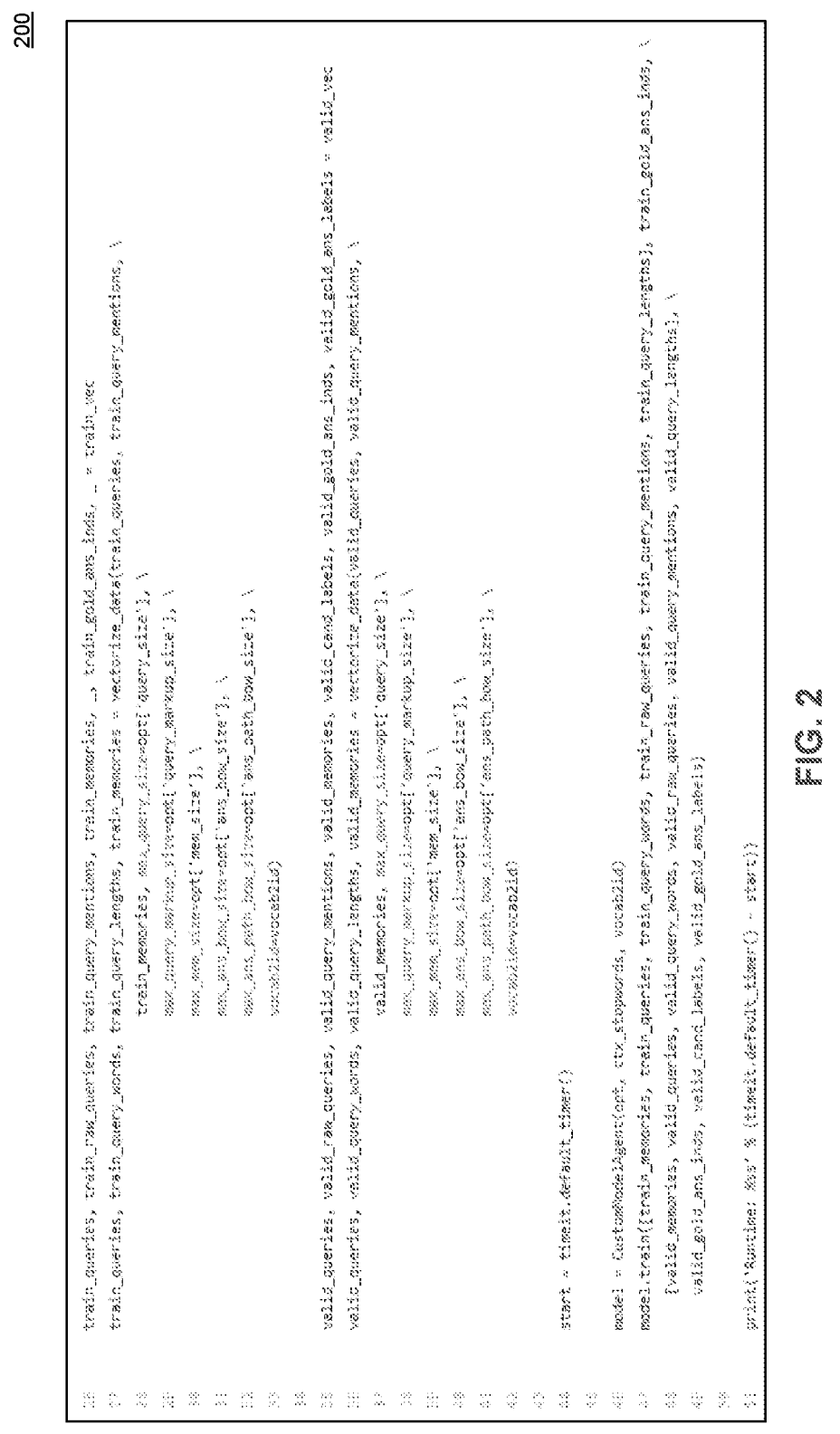

FIG. 2 depicts example pseudocode 200 for training an AWL model in an illustrative embodiment. The pseudocode 200 illustrates a code snippet used to train the AWL model by collating data offline via multiple channels. In one or more embodiments, the process of data infusion is automated for a production environment by combining input from multiple reliable knowledge bases related to various technical or other types of topics. FIG. 3 depicts example pseudocode 300 for testing an AWL model in an illustrative embodiment.

The resource selection platform 110 includes an output component 150 comprising a data visualization component 151. The output component 150 receives the generated questions and the computed confidence scores from the AI/ML engine 130, which are provided to a user via the output component 150. The data visualization component 151 configures the plurality of questions and/or the plurality of confidence scores for viewing by a user on a user interface of a user device 102. For example, the data visualization component 151 organizes the data in an appropriate form for viewing on an application with an active interface (e.g., graphical user interface (GUI)) on the user devices 102. As noted above, the data, such as confidence scores, may be ranked and organized according to different categories to give a user a snapshot of the results of a candidate interview. The data visualization component 151 may further generate visualizations of the data in, for example, graphs, charts, heat maps, or other data visualization tools. The data visualization component 151 may dynamically change the visualizations for a user in real-time as new questions and responses are provided during an interaction with a candidate.

The knowledge base 131 and/or databases in some embodiments are implemented using one or more storage systems or devices associated with the resource selection platform 110. In some embodiments, one or more of the storage systems utilized to implement the knowledge base 131 and/or databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the resource selection platform 110, the input component 120, the AI/ML engine 130, and/or the output component 150 in other embodiments can be implemented at least in part externally to the resource selection platform 110, for example, as stand-alone servers, sets of servers or other types of systems coupled to the network 104. For example, the input component 120, the AWL engine 130, and/or the output component 150 may be provided as cloud services accessible by the resource selection platform 110.

The input component 120, the AI/ML engine 130, and/or the output component 150 in the FIG. 1 embodiment are each assumed to be implemented using at least one processing device. Each such processing device generally comprises at least one processor and an associated memory, and implements one or more functional modules for controlling certain features of the input component 120, the AI/ML, engine 130, and/or the output component 150.

At least portions of the resource selection platform 110 and the components thereof may be implemented at least in part in the form of software that is stored in memory and executed by a processor. The resource selection platform 110 and the components thereof comprise further hardware and software required for running the resource selection platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the input component 120, the AWL engine 130, the output component 150 and other components of the resource selection platform 110 in the present embodiment are shown as part of the resource selection platform 110, at least a portion of the input component 120, the AI/ML engine 130, the output component 150 and other components of the resource selection platform 110 in other embodiments may be implemented on one or more other processing platforms that are accessible to the resource selection platform 110 over one or more networks. Such components can each be implemented at least in part within another system element or at least in part utilizing one or more stand-alone components coupled to the network 104.

It is assumed that the resource selection platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the input component 120, the AWL engine 130, the output component 150 and other components of the resource selection platform 110, and the elements thereof can each be implemented in the form of one or more LXCs running on one or more VMs. Other arrangements of one or more processing devices of a processing platform can be used to implement the input component 120, the AI/ML engine 130, and the output component 150, as well as other components of the resource selection platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the resource selection platform 110 to reside in different data centers. Numerous other distributed implementations of the resource selection platform 110 are possible.

Accordingly, one or each of the input component 120, the AI/ML engine 130, the output component 150 and other components of the resource selection platform 110 can each be implemented in a distributed manner so as to comprise a plurality of distributed components implemented on respective ones of a plurality of compute nodes of the resource selection platform 110.

It is to be appreciated that these and other features of illustrative embodiments are presented by way of example only, and should not be construed as limiting in any way.

Accordingly, different numbers, types and arrangements of system components such as the input component 120, the AI/ML engine 130, the output component 150 and other components of the resource selection platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the resource selection platform can be offered to cloud infrastructure customers or other users as part of FaaS, CaaS and/or PaaS offerings.

The operation of the information processing system 100 will now be described in further detail with reference to the flow diagram of FIG. 4. With reference to FIG. 4, a process 400 for using AI/ML to evaluate candidate data and responses during a selection process as shown includes steps 402 through 412, and is suitable for use in the system 100 but is more generally applicable to other types of information processing systems comprising a resource selection platform configured for using AI/ML to evaluate candidate data and responses during a selection process.

In step 402, information regarding a candidate is retrieved from a plurality of sources such as, but not necessarily limited to, a social media platform, online publications, webpages, online databases, an uploaded resume and/or an uploaded curriculum vitae of the candidate. One or more network crawling techniques may be used to extract the information from one or more of the plurality of sources In step 404, the information regarding the candidate is analyzed using one or more machine learning techniques, and in step 406 a plurality of questions for the candidate are generated based on the analysis. Analyzing the information regarding the candidate includes cross-referencing experience descriptions from different entities in at least one of the uploaded resume and the uploaded curriculum vitae.

According to one or more embodiments, the plurality of questions for the candidate are generated based on data from a knowledge base. The data from the knowledge base comprises, for example, data identifying one or more expertise areas of the user, and a plurality of flags corresponding to a plurality of topics to avoid for the plurality of questions. The knowledge base is dynamically updated with additional questions generated for one or more additional candidates and answers to the additional questions being provided by the one or more additional candidates.

Step 408 includes receiving and analyzing a plurality of natural language responses to the plurality of questions from the candidate. NLP techniques are used to analyze the plurality of natural language responses.

In step 410, a plurality of confidence scores for the plurality of natural language responses are computed using the one or more machine learning techniques, and in step 412, the plurality of questions and the plurality of confidence scores are provided to a user via a user interface. The plurality of confidence scores for the plurality of natural language responses are computed in real-time during an interaction with the candidate.

The process 400 may further include generating one or more additional questions for the candidate based at least on one or more of the plurality of natural language responses, and/or modifying one or more of the plurality of questions based at least on one or more of the plurality of natural language responses.

It is to be appreciated that the FIG. 4 process and other features and functionality described above can be adapted for use with other types of information systems configured to execute resource selection services on a resource selection platform or other type of processing platform.

The particular processing operations and other system functionality described in conjunction with the flow diagram of FIG. 4 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a resource selection platform as disclosed herein can provide a number of significant advantages relative to conventional arrangements. For example, one or more embodiments are configured to use neural networks to analyze information from multiple sources to build profiles of candidates, generate personalized questions to ask the candidates during an interview process, analyze the candidates' responses to the questions, and in real-time provide users with feedback based on the analysis. The embodiments advantageously provide techniques for verification of the accuracy and correctness of candidate responses based on confidence scores.

The embodiments also provide a dynamic knowledge base which includes various types of data, directives, rules and feedback on which to base candidate questions and analyze responses. The knowledge base is regularly updated based on responses of multiple candidates and data analyzed from a plurality of online sources.

Unlike the embodiments, current approaches are not AI-driven, and fail to analyze data about a candidate and an interviewer to generate personalized questions to be used during an interview process. In addition, unlike the embodiments, conventional methods do not provide techniques for analysis of responses to determine their veracity and quality.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the resource selection platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a resource selection platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
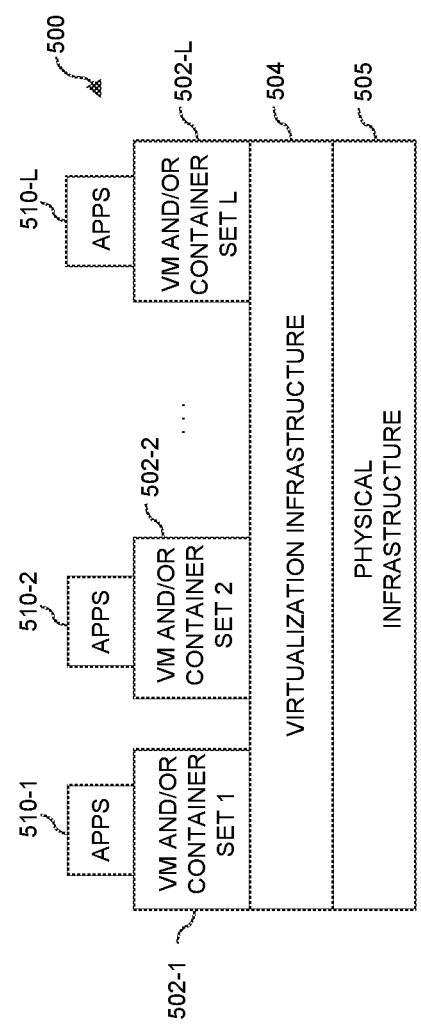
FIGS. 5 and 6 show examples of processing platforms that may be utilized to implement at least a portion of an information processing system in illustrative embodiments.
Figure 6:
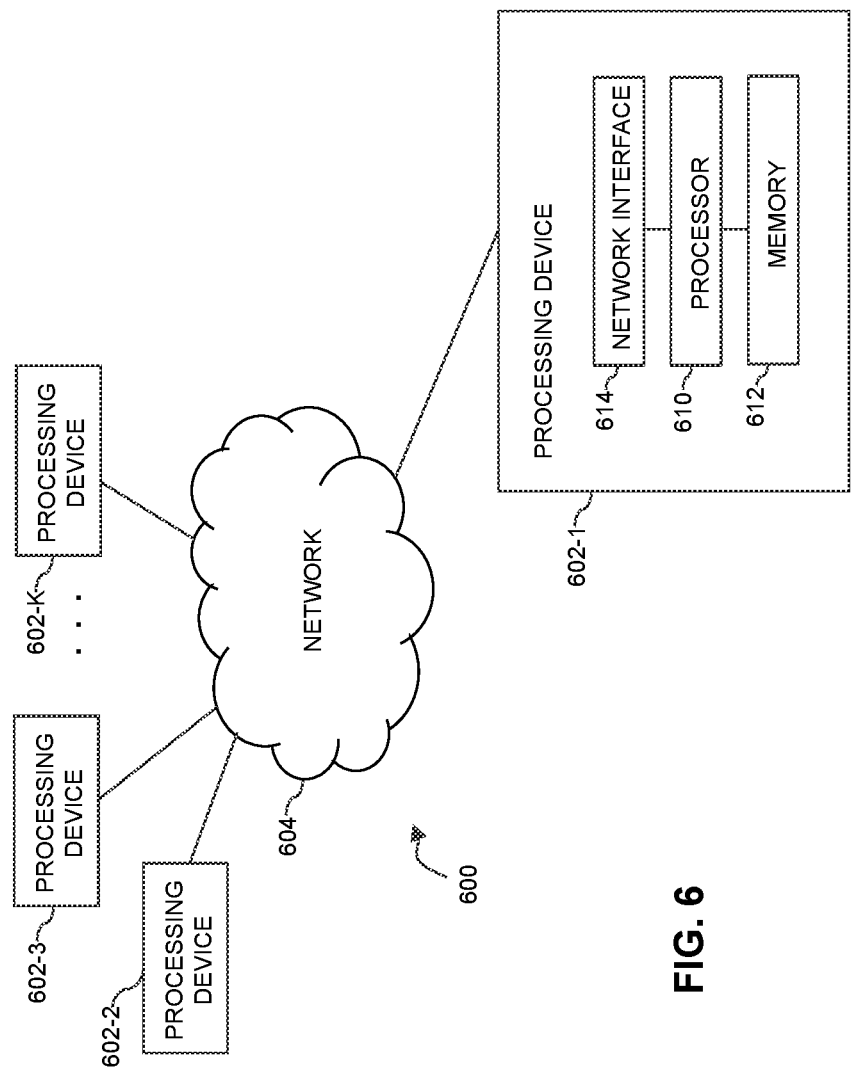

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the resource selection platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and resource selection platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
the at least one processing platform being configured:
to retrieve information regarding a candidate from a plurality of sources;
to analyze the information regarding the candidate using one or more machine learning models;
to generate a plurality of questions for the candidate based on the analysis;
to receive and analyze a plurality of natural language responses to the plurality of questions from the candidate;
to compute a plurality of confidence scores for the plurality of natural language responses using the one or more machine learning models; and
to provide the plurality of questions and the plurality of confidence scores to a user via a user interface;
wherein generating a plurality of questions for the candidate based on the analysis comprises:
generating the plurality of questions for the candidate based on data from a knowledge base, wherein the data from the knowledge base comprises data identifying one or more expertise areas of the user;
wherein receiving and analyzing includes utilizing the responses to the plurality of questions as input to train the one or more machine learning models to enable identification of a baseline speech pattern for the candidate;
wherein computing the plurality of confidence scores includes (i) identifying one or more other speech patterns for the candidate different from the baseline speech pattern, (ii) determining consistencies between the responses to the plurality of questions and the information regarding the candidate from the plurality of sources, and (iii) comparing the responses to the plurality of questions from the candidate to the same or similar responses given by one or more other candidates;
wherein at least one of the confidence scores of the plurality of confidence scores is representative of the one or more other speech patterns; and
wherein the at least one processing platform is further configured to:
generate at least a second plurality of questions for one or more additional candidates; and
dynamically update the knowledge base with the at least a second plurality of questions and answers to the at least a second plurality of questions provided by the one or more additional candidates.

2. The apparatus of claim 1 wherein the at least one processing platform is further configured to use natural language processing techniques to analyze the plurality of natural language responses.

3. The apparatus of claim 1 wherein, in retrieving the information regarding the candidate from the plurality of sources, the at least one processing platform is configured to use one or more network crawling techniques to extract the information from one or more of the plurality of sources.

4. The apparatus of claim 3 wherein the one or more of plurality of sources comprise at least one of a social media platform, online publications, webpages and online databases.

5. The apparatus of claim 1 wherein the plurality of sources comprises at least one of an uploaded resume and an uploaded curriculum vitae of the candidate.

6. The apparatus of claim 5 wherein, in analyzing the information regarding the candidate, the at least one processing platform is configured to cross-reference experience descriptions from different entities in at least one of the uploaded resume and the uploaded curriculum vitae.

7. The apparatus of claim 1 wherein the one or more machine learning models comprise a duo-directional attentive memory network.

8. The apparatus of claim 1 wherein the data from the knowledge base comprises a plurality of flags corresponding to a plurality of topics to avoid for the plurality of questions.

9. The apparatus of claim 1 wherein the at least one processing platform is further configured to generate one or more additional questions for the candidate based at least on one or more of the plurality of natural language responses.

10. The apparatus of claim 1 wherein the at least one processing platform is further configured to modify one or more of the plurality of questions based at least on one or more of the plurality of natural language responses.

11. The apparatus of claim 1 wherein computing the plurality of confidence scores for the plurality of natural language responses is performed in real-time.

12. The apparatus of claim 1 wherein the at least one processing platform is further configured to rank the plurality of confidence scores for the plurality of natural language responses.

13. A method comprising:
retrieving information regarding a candidate from a plurality of sources;
analyzing the information regarding the candidate using one or more machine learning models;
generating a plurality of questions for the candidate based on the analysis;
receiving and analyzing a plurality of natural language responses to the plurality of questions from the candidate;
computing a plurality of confidence scores for the plurality of natural language responses using the one or more machine learning models; and
providing the plurality of questions and the plurality of confidence scores to a user via a user interface;
wherein generating a plurality of questions for the candidate based on the analysis comprises:
generating the plurality of questions for the candidate based on data from a knowledge base, wherein the data from the knowledge base comprises data identifying one or more expertise areas of the user;
wherein receiving and analyzing includes utilizing the responses to the plurality of questions as input to train the one or more machine learning models to enable identification of a baseline speech pattern for the candidate;
wherein computing the plurality of confidence scores includes (i) identifying one or more other speech patterns for the candidate different from the baseline speech pattern, (ii) determining consistencies between the responses to the plurality of questions and the information regarding the candidate from the plurality of sources, and (iii) comparing the responses to the plurality of questions from the candidate to the same or similar responses given by one or more other candidates;
wherein at least one of the confidence scores of the plurality of confidence scores is representative of the one or more other speech patterns;
wherein the method further comprises:
generating at least a second plurality of questions for one or more additional candidates; and
dynamically updating the knowledge base with the at least a second plurality of questions and answers to the at least a second plurality of questions provided by the one or more additional candidates; and
wherein the method is performed by at least one processing platform comprising at least one processing device comprising a processor coupled to a memory.

14. The method of claim 13 further comprising generating one or more additional questions for the candidate based at least on one or more of the plurality of natural language responses.

15. The method according to claim 13 wherein the data from the knowledge base comprises a plurality of flags corresponding to a plurality of topics to avoid for the plurality of questions.

16. The method according to claim 13 wherein the one or more machine learning models comprise a duo-directional attentive memory network.

17. The method according to claim 13 further comprising modifying one or more of the plurality of questions based at least on one or more of the plurality of natural language responses.

18. A computer program product comprising a non-transitory processor-readable storage medium having stored therein program code of one or more software programs, wherein the program code when executed by at least one processing platform causes the at least one processing platform:
to retrieve information regarding a candidate from a plurality of sources;
to analyze the information regarding the candidate using one or more machine learning models;
to generate a plurality of questions for the candidate based on the analysis;
to receive and analyze a plurality of natural language responses to the plurality of questions from the candidate;
to compute a plurality of confidence scores for the plurality of natural language responses using the one or more machine learning models; and
to provide the plurality of questions and the plurality of confidence scores to a user via a user interface;
wherein generating a plurality of questions for the candidate based on the analysis comprises:
generating the plurality of questions for the candidate based on data from a knowledge base, wherein the data from the knowledge base comprises data identifying one or more expertise areas of the user;
wherein receiving and analyzing includes utilizing the responses to the plurality of questions as input to train the one or more machine learning models to enable identification of a baseline speech pattern for the candidate;
wherein computing the plurality of confidence scores includes (i) identifying one or more other speech patterns for the candidate different from the baseline speech pattern, (ii) determining consistencies between the responses to the plurality of questions and the information regarding the candidate from the plurality of sources, and (iii) comparing the responses to the plurality of questions from the candidate to the same or similar responses given by one or more other candidates;
wherein at least one of the confidence scores of the plurality of confidence scores is representative of the one or more other speech patterns; and
wherein the program code when executed by the at least one processing platform further causes the at least one processing platform:
to generate at least a second plurality of questions for one or more additional candidates; and
to dynamically update the knowledge base with the at least a second plurality of questions and answers to the at least a second plurality of questions provided by the one or more additional candidates.

19. The computer program product according to claim 18 wherein the data from the knowledge base comprises a plurality of flags corresponding to a plurality of topics to avoid for the plurality of questions.

20. The computer program product according to claim 18 wherein the one or more machine learning models comprise a duo-directional attentive memory network.

\* \* \* \* \*